Patented Sept. 10, 1946

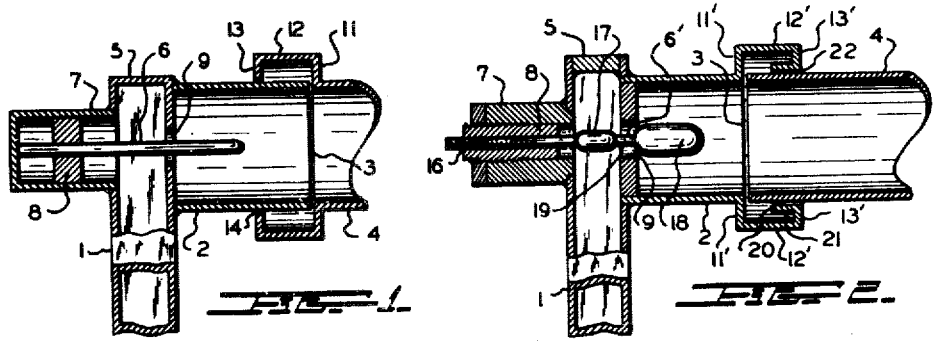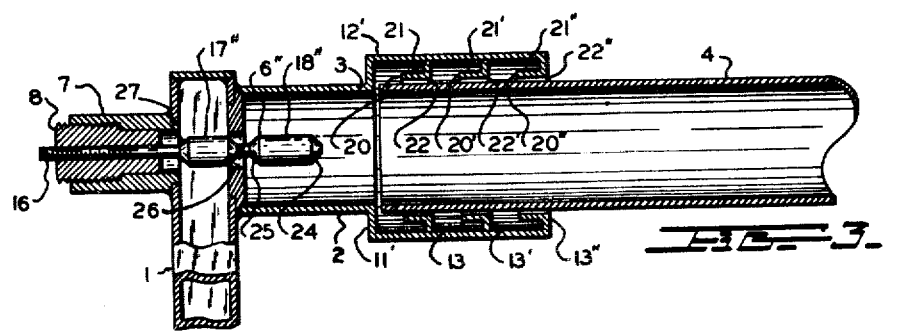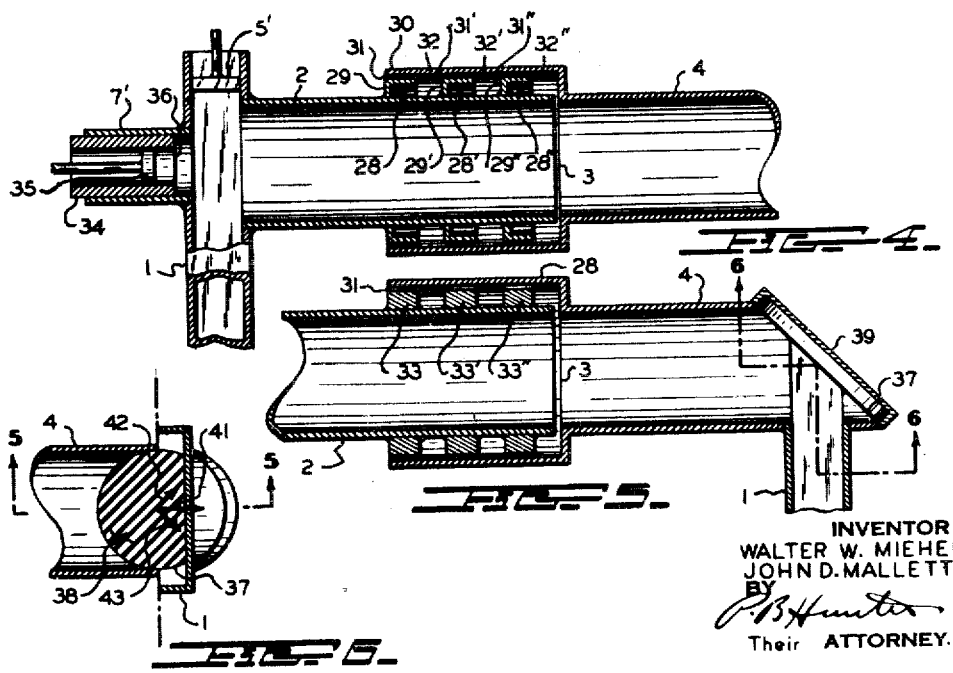

2,407,318

UNITED STATES PATENT OFFICE 2,407,318

HIGH-FREQUENCY APPARATUS

Walter W. Micher, Mineola, and John D. Mallett, Garden City, N. Y., assignors to Sperry Gyroscope Company, Inc., Brooklyn, N. Y., a corporation of New York Application June 18, 1942, Serial No. 447,524

21 Claims. (Cl. 178—44)

The present invention relates to the art including ultra high frequency energy translating apparatus.

In high frequency systems using frequencies of the order of $10^9$ or $10^{10}$ or higher cycles per second it is advantageous to use electromagnetic wave guides for the conduction of high frequency energy. As is well known, such wave guides may have many types of cross-section. However, the rectangular type of wave guide has been found to be highly advantageous because in its lowest mode of excitation, corresponding to the transverse electric or TE mode, high frequency energy is conducted along the wave guide with fixed and definite orientation of the electric field vector, which is termed the polarization. Accordingly, the polarization is exactly determined and may be easily controlled, which is not the usual case with either higher modes of excitation in rectangular wave guides or with other shapes of wave guides. In addition, the rectangular wave guide is easily adapted for the conduction of high frequency energy around corners, since sharp angular bends may be formed in rectangular wave guides using proper designs which create little reflection of energy or mismatching in impedances, and which do not distort the type of field produced within the wave guide.

However, in many applications of such wave guides it is necessary to conduct energy from a stationary member to a rotating member or vice versa, thus requiring the use of suitable rotating wave guide joints. For mechanical reasons these joints must be made with the use of circular cross-section wave guides. Furthermore, if such joints are combined with bends in the circular wave guide, undesirable modulations of the intensity of the energy at the frequency of rotation or harmonics thereof may be produced, as well as undesirable rotations of the directions of polarization with respect to the wave guide, rendering more difficult the problem of efficiently conducting energy down through the wave guide and of controllably utilizing this energy. This is especially true where energy in the transverse electric or TE mode is transmitted through the circular wave guide. Such modulation may be minimized by use of TM or transverse magnetic waves.

The present invention is directed toward improved devices for overcoming these problems. This is done in the present instance by the use of suitable "wave transformers" or "wave converters" which couple a rectangular wave guide excited by TE electromagnetic waves with a circular wave guide excited by electromagnetic waves of the TM type. Such transformers are bilateral in character; that is, energy may be conducted either from a circular to the rectangular guide, or vice versa.

Furthermore, highly efficient low impedance rotating joints are provided for conducting high frequency energy from one member to a second member rotatable with respect thereto, without undesirable modulation of the energy passing thereacross.

In this manner, the desirable characteristics of TE-excited rectangular guides may be used, where energy is to be conducted around corners, the wave converters of the present invention providing simple and efficient means for transforming such energy to TM mode energy in a circular guide for use with the rotating joints of the invention, whereby increased utility and versatility of such wave guide devices may be obtained.

Accordingly, it is an object of the present invention to provide improved rotating joints for wave guides adapted for the efficient transmission of high frequency radiant energy with low losses and substantially no modulation due to relative rotation of the two members of the joint.

It is a further object of the present invention to provide improved high frequency translating devices for conducting high frequency radiant energy from a round wave guide to a rectangular wave guide, or vice versa, with higher efficiency, simplicity and compactness.

It is a further object of the present invention to provide improved wave guide apparatus for coupling circularly polarized waves with linearly polarized waves.

Other objects and advantages will become apparent from the specification, taken in connection with the accompanying drawing wherein the invention is embodied in concrete form.

Referring to the drawing,

Fig. 1 shows one form of rectangular-to-round energy transformer, in cooperation with one form of rotating joint.

Figs. 2 to 5 show modifications of the device of Fig. 1 including modified transformation devices and modified rotating joints.

Fig. 6 shows a cross-sectional view of a portion of Fig. 5.

As described above, the desirability of round wave guides energized by the TM type of wave for use in rotating joints, and of rectangular wave guides energized by TE waves for use in corners and bends, necessitates the use of transformation devices for converting from round to rectangular wave guides and simultaneously from TM to TE waves, and vice versa.

One type of such converter is shown in Fig. 1. Here the energy flowing along rectangular wave guide 1 excites an antenna member 6 positioned transversely of wave guide 1; that is, along the direction of the electric vector of the field within wave guide 1. Electromagnetic waves are thereby induced in antenna 6. These waves may be strengthened in intensity by suitably tuning the antenna 6, as by coupling thereto a stub short-circuited transmission line 7 whose short circuiting plug 8 is positioned at a point to provide maximum amplitude of induced voltage in antenna 6. Antenna 6 may also be electrically spaced from the end 5 of wave guide 1 by substantially an odd multiple of a quarter wave length of the operating frequency, measured inside the wave guide, to improve the efficiency of transformation. However, this is not entirely necessary if the antenna 6 is properly designed.

Antenna 6 extends through a suitable opening 9 in the wall of guide 1 and enters the circular wave guide 2, being disposed axially and concentrically thereof. The presence of the induced electromagnetic waves on antenna 6 thereby generates corresponding waves in wave guide 2. By virtue of the axial position of antenna 6, the waves induced in circular wave guide 2 will be of the required TM type, which will then be suitably projected down the length of the wave guide 2. The length of antenna 6 projecting into wave guide 2 is preferably electrically equivalent to substantially a half wave length of the operating frequency.

It is to be understood that this device will also operate in the inverse manner to convert a TM wave in guide 2 to a TE wave in guide 1.

Fig. 1 also shows a suitable rotating joint 3 for coupling a stationary circular wave guide 2 to a rotating circular wave guide 4. It will be clear that wave guide 4 may be made stationary, and wave guide 2 rotating, this being merely an inversion of the functions of two elements without changing their inter-relationship.

Wave guide 4 is made of the same size and wall thickness as wave guide 2 and is placed as closely as possible to the end of wave guide 2 but not in contact therewith. A flange 11 is formed at the end of wave guide 4 to which is connected a concentric sleeve 12 of suitable length terminating at a further flange 13 connected to sleeve 12 but insulated from wave guide 2 by a very narrow gap 14.

The length of sleeve 12 and its inner diameter are so chosen, with respect to the operating frequency and the outer diameter of wave guide 2, as to present a very low impedance when viewed from the joint 3, whereby joint 3 offers very little attenuation to the waves being transmitted along wave guides 2 and 4, and a minimum amount of energy is radiated from gap 14. Effectively flange 13 forms a short circuit for the concentric transmission line formed by wave guide 2 and sleeve 12. Hence preferably sleeve 12 should be electrically one-half wavelength long, whereby its impedance in parallel with the impedance of gap 14 will appear as a low impedance at joint 3.

It will be clear that flange 11, sleeve 12 and flange 13 may be formed on wave guide 2 instead of wave guide 4 as shown, if desired.

Fig. 2 shows an improved form of rectangular-to-round or round-to-rectangular wave guide converting device. In this case, the position of the shorting plug 8 is made adjustable as by threading it into the outer conductor of stub line 7. Any other type of adjustment may be provided. In addition, the antenna 6', equivalent in function to antenna 6, is made adjustable as by threading or sliding within a bore 16 formed in plug 8, to obtain maximum energy coupling between rectangular wave guide 1 and circular wave guide 2.

It has been found that more efficient transformation of energy may be obtained by forming antennna 6' of larger diameter, since then a greater surface area is presented for the transmission of the currents along antenna 6', resulting in lower losses. Also, the frequency characteristics of the system are thereby improved, making the system efficiently responsive to a wider range of frequencies. However, it is also desirable to maintain opening 9 as small as possible, to prevent excitation of round wave guide 2 by TE waves, caused by the difference in potential which necessarily exists across opening 9 by virtue of the fact that the potential in the rectangular guide 1 must decrease to zero at the closed short-circuited end 5 of the section.

Accordingly, antenna 6' is formed with two enlarged sections 17 and 18 joined by a smaller section 19 which passes through opening 9, section 18 again being approximately a half wave length long electrically.

This modification of energy converter is much more flexible in operation since both the tuning of the antenna 6', as by means of plug 8, and the coupling between the two wave guides 2 and 4, as by adjustment within bore 16, may be independently adjusted.

Fig. 2 also shows another type of rotating joint. Here flange 11' is shown formed on stationary wave guide 2, although it is clear that it could be formed on rotating wave guide 4 in the same manner shown in Fig. 1. Sleeve 12' is formed similar to sleeve 12 of Fig. 1, but flange 13', instead of simply having its free end closely spaced from wave guide 2, as in Fig. 1, now has its free end turned under to form a further sleeve 21 coaxial with wave guide 4 but not in contact therewith.

Wave guide 4 and sleeve 21 form a low impedance concentric transmission line section which serves to reflect or transform the value of the impedance existing at one end 22 thereof to a different value as seen at the other end, herein designated as 20. The value of the impedance at end 22, in general, corresponds to the radiation impedance which, in turn, may be influenced by diverse factors, the effect of which is not readily ascertainable. It is desired, however, that the impedance at joint 3 be of a very low value and substantially independent of any non-ascertainable, unknown, or variable impedance values such as may, from time to time, exist at end 22. This desideratum is accomplished by the means herein provided as will presently appear.

The impedance value existing at end 22, when transformed by means of the transmission line section 4, 21, is effectively in series with the impedance value presented at the open end of the short-circuited concentric transmission line section formed by sleeve 21 and sleeve 12'. If, as herein, the length of section 21, 12' is selected to be of electrical length substantially equal to one-quarter wave length, the impedance seen at its opening 20 is of a very high, theoretically infinite, value. Thus it will be seen that the total impedance at end 20, comprising the series connection of this theoretically infinite impedance and the unknown transformed impedance, will be very high. The further section of transmission line comprising wave guide 4 and sleeve 12' is also adjusted or selected so that the impedance existing at end 20 will be reflected at joint 3 as a very low impedance, that is, effectively this transmission line section is also a quarter wave section. It will be clear, however, because of the shape of this transmission line section that the physical length will be less than one-quarter wavelength.

In this way the transformed or reflected impedance at joint 3 will have a very low value upon which the unknown impedance of end 22 will have substantially no effect. It is thus assured that the rotating joint 3 will present a very low impedance to the transmission of high frequency energy therethrough, which impedance will be substantially independent of any unknown factors existing outside the wave guide. Hence, efficient transmission of high frequency energy across the joint is produced.

Fig. 3 shows a further modification of energy converter and rotating joint. Here antenna 6" is made doubly adjustable as in Fig. 2, but instead of having enlarged rounded portions, it has been found satisfactory to use cylindrical portions 17" and 18" having beveled or chamfered ends such as 24, 25, and 26, 27. This yields the further advantage of ease of construction while retaining all the electromagnetic advantages of the device of Fig. 2.

With the construction of Fig. 3 it has been found that the length of section 18" of antenna 6" may be made substantially non-critical by proper choice of the diameter of section 18" relative to the inner diameter of guide 2, and by proper choice of the chamfer angle. Thus, as is well-known, a wave guide may be considered to have a characteristic impedance, which is defined as the ratio of the electric to magnetic energies in the wave guide. By matching the characteristic impedance of the concentric line formed by section 18" and wave guide 2 to the characteristic impedance of wave guide 2 (or 4), and by making the bevel angle of beveled section 24 in the neighborhood of 50° for a ratio of antenna diameter to inner diameter of wave guide 2 in the neighborhood of 0.42, it has been found that efficient excitation of wave guide 2 from antenna 6" may be effected, without regard to the length of section 18".

Fig. 3 also shows a further rotating joint which, in effect, exemplifies an extension of the principles of the device of Fig. 2. Thus, the type of impedance matching disclosed in Fig. 2, which assures a low impedance at joint 3, is repeated in several stages, shown in this case as three in number, although it will be clear that any desirable number of such stages could be used. In the first stage, the impedance existing at end 22" due, for example, to radiation of energy and the effect of surrounding objects, is transformed by low impedance concentric line 21", 4 to end 20", where it is placed in series with the very high impedance of short-circuited quarter-wave concentric line section 21", 12'. The resulting high impedance is transformed by quarter-wave line 12', 4 to end 22', where it appears as a very low impedance. This low impedance is transformed by quarter-wave line 21', 4 to appear as a high impedance at end 20" in series with the very high impedance of short-circuited quarter-wave line 21', 12', to form a still higher impedance. This process is repeated as many times as is desired or is necessary, until at joint 3 there is obtained a very low impedance which assures efficient transmission and small energy loss of the TM energy across rotating joint 3. This device also provides a broad frequency response for the joint, which is quite desirable, the frequency response becoming more improved with increase in the number of stages used.

Fig. 4 shows a rotating joint similar in principle to that of Fig. 3. Here a plurality of sleeves 28, 28', 28" are attached to one of the relatively movable wave guides, such as 2, by respective rings 29, 29', 29". A sleeve 30 is connected to the other wave guide 4 and cooperates with sleeves 28, 28' and 28", and wave guide 2 in a manner similar to that of Fig. 3. Thus, the unknown impedance at end 31 is transformed by line 30, 28 to end 32 where it is connected in series with the high impedance of short-circuited quarter wave line 28, 2. The resulting high series impedance is transformed to a low impedance at end 31' by quarter-wave line 30, 2, where it is again transformed to a high impedance at end 32' by quarter-wave line 30, 28'. At 32' this high transformed impedance is connected in series with the high impedance of short-circuited quarter-wave line 28', 2, and the resultant is again transformed by quarter-wave line 30, 2 to a low impedance at end 31". This process may be repeated as many times as desired, deriving a still lower impedance at each stage, until a suitable low impedance is obtained for joint 3. It will be clear that the present device need not be restricted to three stages, as shown, but may use any desirable number.

It is to be noted that the use of more stages, both in Fig. 3 and Fig. 4, and also in Fig. 5 to be described, improves the frequency characteristics of the joint, and permits its efficient use with more widely varying frequencies as the number of stages is increased.

Fig. 4 also shows another form of wave transformer for converting TE waves in a rectangular wave guide into TM waves in a round guide. In the present instance no antenna member is used, and the production of only TM waves for the round guide is assured by the use of a filter-type device for suppressing TE waves in the round guide 2. For this purpose, use is made of the property that TE waves may be propagated in smaller round guides than those in which TM waves may be propagated; that is, the TE mode is the lowest mode for round wave guides.

Thus, referring to Fig. 4, the rectangular wave guide 1 is terminated by an adjustable plunger 5' which assures a high wave intensity at the center of the round wave guide 2. Opposite the round wave guide 2 is placed the stub line 7' for providing high intensity for the axial TM wave transmission along wave guide 2. Slidably mounted within stud sleeve 7' is a thick sleeve 34 whose inner diameter is chosen to have a value at which TM waves cannot occur; that is, the diameter is so chosen that TM waves cannot excite this section of wave guide. Hence all TM wave energy will be reflected from the face 36 of sleeve 34, which is thereupon adjusted to the position for which high intensity TM energy will be propagated along guide 2.

However, the TE energy still may exist within sleeve 34, and is therefore conducted down sleeve 34 until reflected by adjustable plug 35, slidably mounted therein. Plug 35 is positioned to a position at which the reflected energy substantially neutralizes any TE energy at the propagating end of wave guide 2, and hence effectively suppresses any transmission of TE energy while not affecting the transmission of TM energy, as is desired.

Fig. 5 shows a further modification of rotating joint. Here in place of the sleeves 28, 28', 28" and rings 29, 29', 29" there are used the solid rings 33, 33', 33" which cooperate with sleeve 28, similar to that in Fig. 4. These rings 33, 33', 33" are substantially one-quarter wave long, and are severally spaced substantially one-quarter wavelength apart. The structure shown in Fig. 5 will be seen to be similar to the filter structure disclosed in copending Hansen application Serial No. 417,229, filed October 31, 1941, to which reference is made for an explanation of the theory of operation. In effect, the external impedance at end 31 is connected in cascade with a high impedance comprising a filter arrangement 33, 33', 33" and 28, and the resulting high impedance is effectively transformed into a very low series impedance at joint 3.

Figs. 5 and 6 also show another type of wave transformer. Thus rectangular wave guide 1 joins the circular wave guide 4 at right angles. At the junction of these wave guides, and positioned obliquely with respect to each of them, is a grid 37 of parallel conductive wires 38. The orientation of the wires 38 of the grid 37 is preferably at a 45° angle to the direction of the electric vector of the energy in wave guide 1, which normally for the lowest mode of TE energization will be across the shortest dimension thereof as shown by vector 41. A reflecting conducting plate 39, is positioned parallel to and behind grid 37 separated therefrom by substantially one-eighth of the wave length of the electromagnetic energy.

In operation, considering for the moment energy being transformed from wave guide 1 to wave guide 4 (although it it is be understood that the device is fully bilateral) energy flowing along wave guide 1 having an electric vector as shown by 41 will impinge upon grid 37. The component 42 of the electric vector 41 parallel to the grid wires 38 will be reflected thereby, and projected axially into circular wave guide 4, the grid wires 38 simply acting effectively as a plane mirror with respect to this component. With respect to the component 43 of the electric vector 41 perpendicular to grid wires 38, substantially no reflection will take place, and the energy will pass through the grid 37. Thereafter this energy will be reflected from reflecting plate 39 and, again passing through grid 37 with substantially no hindrance, will be projected also into circular wave guide 4.

It will be noted that the second component of the energy projected into wave guide 4 corresponding to vector 43 is delayed a quarter wavelength or 90 electrical degrees with respect to the first component reflected from grid 37. In addition, this second component has a polarization (or electric vector) perpendicular to that of the first component. Accordingly, as is well known, the net result in wave guide 4 will be a circularly polarized wave, that is, one in which the plane of polarization or the electric vector will be continuously rotating at the operating frequency as the energy is projected along the wave guide 4.

Since this circularly polarized energy is substantially independent of any rotation of wave guide 4 about its axis, it may be usefully employed in conjunction with rotating joints such as of the type shown in Figs. 1 to 5.

It will be clear that this same wave transformer may be used in reverse to convert a circularly polarized wave into a TE wave in a rectangular wave guide. Preferably this is done in the device of Fig. 5 after the energy is transferred across the rotating joint in order that this energy may be conveniently and usefully conducted to further portions of the circuit without rotational modulation, as discussed above.

It will be noted that with such circularly polarized waves the diameter of a circular wave guide such as 4 may be chosen smaller than the corresponding value in the preceding figures since the wave, although circularly polarized, remains essentially of the TE type, which is adapted to excite a smaller diameter circular wave guide than the TM mode wave used in the circular wave guides of the preceding figures.

Although the circular wave guide joints of Figs. 1 to 5 have been described with respect to relatively rotatable wave guide sections, it will be clear that they can be used equally well for relatively fixed wave guide portions which are not in mutual contact.

Also, the rotating joints described above need not be restricted to circular wave guides, but may be used wherever high frequency energy is to be conducted between relatively rotatable conductors, such as in concentric lines or single tubular lines.

In addition, the wave transformers described above may be used to transfer energy between rectangular wave guides and concentric lines, the antenna member 6 then being an extension of the concentric inner conductor of the line.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An energy coupling device between a rectangular wave guide and a circular wave guide, comprising an antenna member positioned transversely of said rectangular guide and extending coaxially of said circular wave guide, said antenna member having an enlarged portion within said rectangular wave guide and a further enlarged portion within said circular wave guide, said enlarged portions being separated by a narrow connecting portion.

2. An energy coupling device between a rectangular wave guide and a circular wave guide, comprising a cylindrical rod antenna member positioned transversely of said rectangular guide and extending coaxially of said circular wave guide and having an enlarged cylindrical portion within each of said wave guides, said enlarged portions being connected to said rod by beveled portions having an angle of substantially 50°, the ratio of the outer diameter of said enlarged cylindrical portion within circular wave guide to the inner diameter of said circular wave guide being of the order of 0.4.

3. An energy coupling device between two hollow high frequency energy conductors having dissimilar modes of propagation of high frequency energy therethrough, comprising an antenna member positioned transversely of one of said conductors and extending coaxially into the other of said conductors, said antenna member having enlarged portions respectively within both of said conductors and separated by a narrow connecting portion therebetween.

4. An energy coupling device between two hollow conductors having dissimilar modes of propagation, comprising an antenna member positioned transversely of one of said conductors and extending coaxially into the other of said conductors, said antenna member having an enlarged portion within each of said conductors, said portions being separated by a narrow connecting portion therebetween.

5. An energy coupling device between two wave guides having dissimilar modes of propagation, comprising an antenna member positioned transversely of one of said wave guides and extending coaxially into the other of said wave guides, said antenna member having an enlarged portion within the first of said wave guides and a further enlarged portion within the second of said wave guides, said enlarged portions being separated by a narrow connecting portion between both of said wave guides.

6. An energy coupling device as in claim 5, wherein one of said wave guides is excited in the TE mode and the other of said guides in the TM mode.

7. An energy coupling device between a rectangular wave guide and a circular wave guide comprising an antenna member positioned transversely of said rectangular guide and extending coaxially of said circular wave guide, said antenna member having an enlarged portion within said rectangular wave guide and a further enlarged portion within said circular wave guide.

8. An energy coupling device for transferring high frequency energy between a rectangular TE-excited wave guide and a circular TM-excited wave guide, comprising an antenna member positioned transversely of said rectangular guide and extending coaxially of said circular wave guide, said antenna member having an enlarged portion within said rectangular wave guide and a further enlarged portion of a length of substantially one-half wavelength within said circular wave guide.

9. An energy coupling device for transferring high frequency energy between a rectangular TE-excited wave guide and a circular TM-excited wave guide comprising an antenna member positioned transversely of said rectangular guide and extending coaxially of said circular wave guide, said antenna member comprising a cylindrical rod having an enlarged cylindrical portion connected thereto by conical portions having an apex angle of substantially 50° within each of said wave guides.

10. An energy coupling device between a rectangular wave guide and a circular wave guide comprising an antenna member positioned transversely of said rectangular guide and extending coaxially of said circular wave guide, said antenna member having an enlarged portion within said rectangular wave guide and a further enlarged portion within said circular wave guide, and further including means for tuning said antenna member, said antenna member being slidably accommodated and adjustable within said tuning means.

11. An energy coupling device between a rectangular wave guide and a circular wave guide comprising an antenna member positioned transversely of said rectangular guide and extending coaxially of said circular wave guide, said antenna member having an enlarged portion within said rectangular wave guide and a further enlarged portion within said circular wave guide, and further including means for tuning said antenna member, said tuning means comprising an outer conductor, and a movable shorting plug inserted within said outer conductor and having a bore slidably accommodating said antenna member, whereby said antenna member is adjustable coupled to said circular wave guide.

12. A coupling device comprising a plurality of wave guides having dissimilar modes of propagation, a common apertured wall connecting said guides, and a metal antenna rod having spaced, radially expanded portions disposed respectively in each of said guides and on opposite sides of said common wall.

13. A plurality of contiguous hollow high frequency conductors having dissimilar modes of propagation, a common apertured wall connecting said conductors, and a metal antenna rod having spaced, radially expanded portions disposed respectively in each of said conductors and on opposite sides of said common wall.

14. A microwave device comprising a pair of hollow wave guides having dissimilar modes of propagation, said guides including a common wall having an opening therethrough, an antenna member having portions of dissimilar diameters disposed within said guides, each of said dissimilar diameter portions being disposed within a respective one of said wave guides.

15. A coupling device comprising a plurality of wave guides having dissimilar modes of propagation, a common apertured wall connecting said guides, a metal antenna rod having spaced, radially expanded portions disposed respectively in each of said guides and on opposite sides of said common wall, and means adjustably supporting said antenna rod within said guides.

16. A microwave device comprising a plurality of contiguous hollow wave guides having dissimilar modes of propagation, said guides having an apertured common wall, a conductor antenna rod having spaced, radially expanded portions and positioned transversely of one of said wave guides and extending through said apertured wall into another of said wave guides having dissimilar propagation characteristics, said radially expanded sections being situated respectively in each of said wave guides and on opposite sides of said common wall, and means for adjusting said rod within said guides, comprising means supporting said rod within said wave guides, and means for adjusting said rod within said supporting means so as to provide substantial impedance match between said guides and said conductor rod.

17. An energy coupling device between a first wave guide and a circular wave guide having dissimilar modes of propagation, comprising a metal antenna rod positioned transversely of said first guide and extending into said circular wave guide, said rod having enlarged sections formed thereon and integral therewith and placed in each of said wave guides, said sections having bevelled end portions and having a diameter relative to the inner diameter of said circular guide providing a substantial impedance match between said circular guide and said first guide.

18. A coupling device as defined in claim 12 wherein said radially expanded portions comprise enlarged rounded members connected to said antenna rod.

19. Apparatus for transferring ultra-high-frequency energy between two wave guides, comprising a first conductor extending completely across one of said wave guides and into the other of said wave guides, a hollow tubular conductor concentrically surrounding said first conductor between said wave guides and forming a concentric transmission line section therewith, a second hollow conductor concentrically surrounding the portion of said first conductor projecting on the other side of said first wave guide and forming a concentric transmission line section therewith, means for adjustably short-circuiting said first conductor and said second hollow conductor, and means for adjusting the projection of said first conductor within said other wave guide, whereby ultra-high-frequency energy may be transferred between said wave guides substantially without reflection or the creation of standing waves by suitably adjusting said short-circuiting means and the amount of said projection.

20. Apparatus for transferring ultra-high-frequency energy between two ultra-high-frequency energy conductors of which one is a rectangular wave guide, said apparatus comprising a section of circular wave guide formed of two relatively rotatable portions fixed respectively to said conductors, whereby said two conductors may be rotated relative to one another without interfering with the flow of ultra-high-frequency energy therebetween, means for coupling said wave guide to one of said conductors in a manner to excite TM waves in said circular wave guide section, and means for coupling said circular wave guide section to the other of said conductors to transfer said TM energy to said other conductor, one of said coupling means comprising an adjustable section of concentric transmission line having the inner conductor thereof extending across said rectangular wave guide and coaxially within said circular wave guide section.

21. The apparatus defined in claim 20, further including means for adjusting the amount of projection of said inner conductor within said circular wave guide.

WALTER W. MIEHER.
JOHN D. MALLETT.

Certificate of Correction

Patent No. 2,407,318.   September 10, 1946.

WALTER W. MIEHER ET AL.

It is hereby certified that errors appear in the printed specification of the above numbered patent requiring correction as follows: Column 1, line 40, for "directions" read *direction*; column 2, line 4, for "from a" read *from the*; column 6, line 62, for "stud" read *stub*; column 7, line 42, for "it it is" read *it is to*; column 10, line 10, for "adjustable" read *adjustably*; and that the said Letters Patent should be read with these corrections therein that the same may conform to the record of the case in the Patent Office.

Signed and sealed this 1st day of July, A. D. 1947.

[SEAL]

LESLIE FRAZER,
*First Assistant Commissioner of Patents.*

19. Apparatus for transferring ultra-high-frequency energy between two wave guides, comprising a first conductor extending completely across one of said wave guides and into the other of said wave guides, a hollow tubular conductor concentrically surrounding said first conductor between said wave guides and forming a concentric transmission line section therewith, a second hollow conductor concentrically surrounding the portion of said first conductor projecting on the other side of said first wave guide and forming a concentric transmission line section therewith, means for adjustably short-circuiting said first conductor and said second hollow conductor, and means for adjusting the projection of said first conductor within said other wave guide, whereby ultra-high-frequency energy may be transferred between said wave guides substantially without reflection or the creation of standing waves by suitably adjusting said short-circuiting means and the amount of said projection.

20. Apparatus for transferring ultra-high-frequency energy between two ultra-high-frequency energy conductors of which one is a rectangular wave guide, said apparatus comprising a section of circular wave guide formed of two relatively rotatable portions fixed respectively to said conductors, whereby said two conductors may be rotated relative to one another without interfering with the flow of ultra-high-frequency energy therebetween, means for coupling said wave guide to one of said conductors in a manner to excite TM waves in said circular wave guide section, and means for coupling said circular wave guide section to the other of said conductors to transfer said TM energy to said other conductor, one of said coupling means comprising an adjustable section of concentric transmission line having the inner conductor thereof extending across said rectangular wave guide and coaxially within said circular wave guide section.

21. The apparatus defined in claim 20, further including means for adjusting the amount of projection of said inner conductor within said circular wave guide.

WALTER W. MIEHER.
JOHN D. MALLETT.

Certificate of Correction

Patent No. 2,407,318.   September 10, 1946.

WALTER W. MIEHER ET AL.

It is hereby certified that errors appear in the printed specification of the above numbered patent requiring correction as follows: Column 1, line 40, for "directions" read *direction*; column 2, line 4, for "from a" read *from the*; column 6, line 62, for "stud" read *stub*; column 7, line 42, for "it it is" read *it is to*; column 10, line 10, for "adjustable" read *adjustably*; and that the said Letters Patent should be read with these corrections therein that the same may conform to the record of the case in the Patent Office.

Signed and sealed this 1st day of July, A. D. 1947.

[SEAL]

LESLIE FRAZER,
*First Assistant Commissioner of Patents.*